June 13, 1939.  F. KOGL  2,161,822
APPARATUS FOR PRECASTING CONCRETE STAIR STRUCTURES
Filed Sept. 23, 1937  2 Sheets-Sheet 1
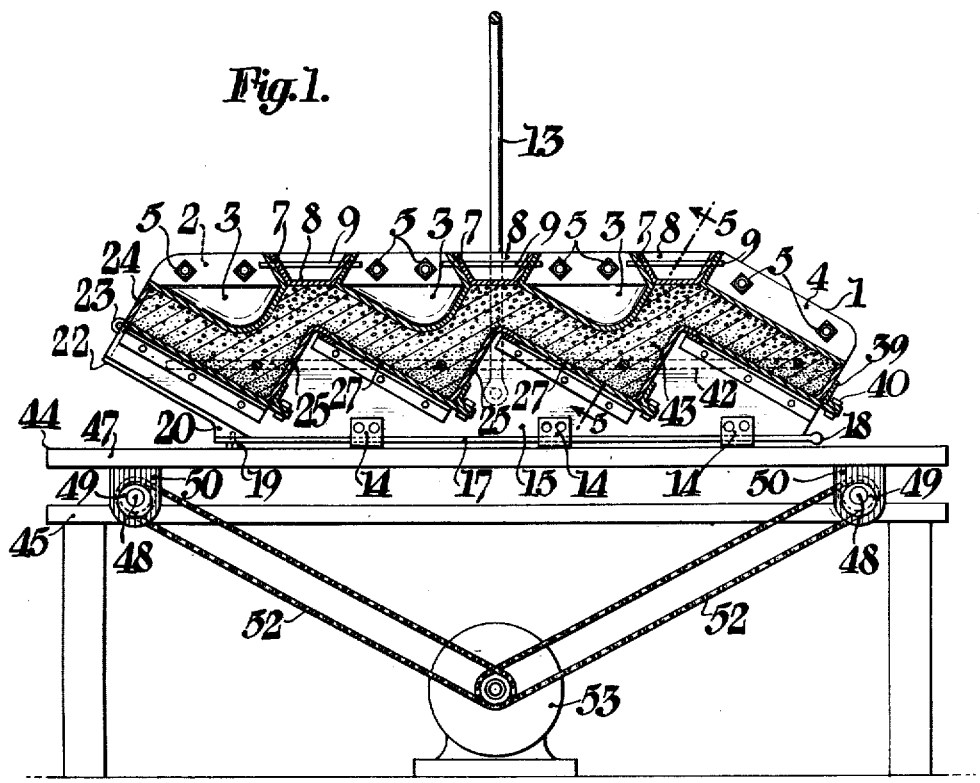
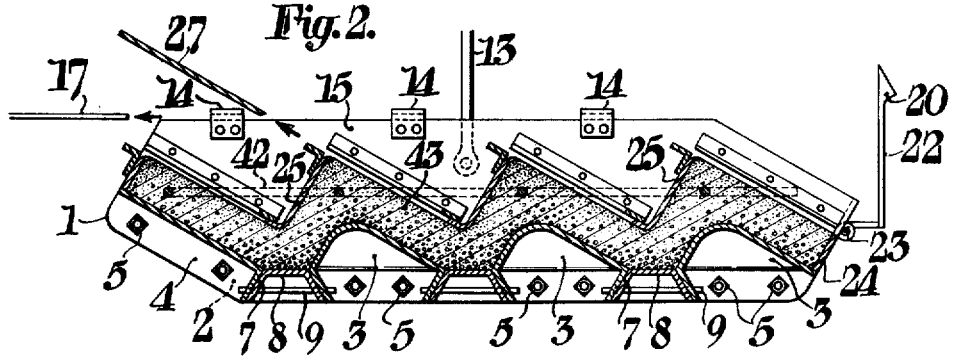
INVENTOR:
Frank Kogl,
BY
ATTORNEY.

June 13, 1939.　　　　F. KOGL　　　　2,161,822
APPARATUS FOR PRECASTING CONCRETE STAIR STRUCTURES
Filed Sept. 23, 1937　　　2 Sheets-Sheet 2
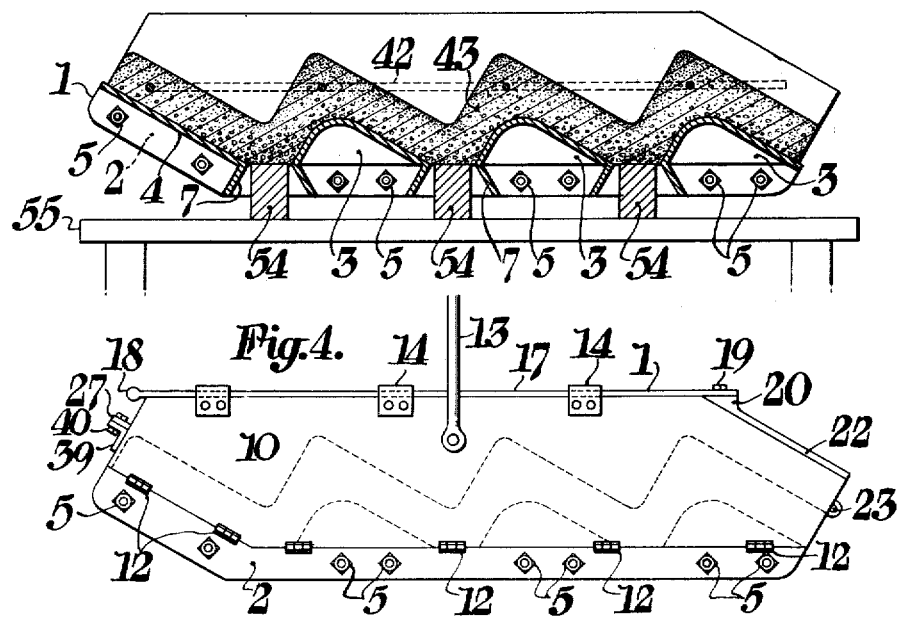
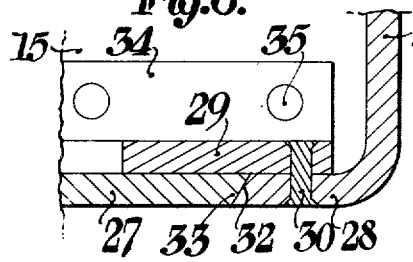
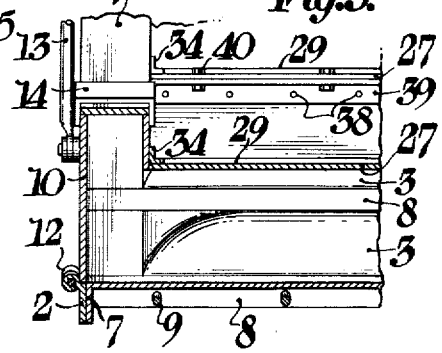
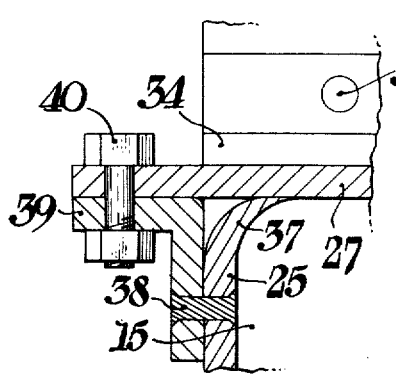
INVENTOR:
Frank Kogl,
BY
ATTORNEY.

Patented June 13, 1939

2,161,822

UNITED STATES PATENT OFFICE 2,161,822

APPARATUS FOR PRECASTING CONCRETE STAIR STRUCTURES

Frank Kogl, St. Kogl, Minn.

Application September 23, 1937, Serial No. 165,295

11 Claims. (Cl. 25—118)

My invention relates to a method and apparatus for molding a mixture such as cement and, more particularly, to the prefabrication of a series of steps in one monolithic unit.

Heretofore it has been the practice, in building a series of concrete steps, to build a mold, probably of wood, on an embankment, pour the cementitious mixture into the mold, shape it up by hand and then leave the whole structure for several days to dry or cure.

Having in mind the defects of the prior art, it is an object of my invention to provide a method and apparatus whereby a series of steps in a unit may be prefabricated of cement, or other similar materials, on a production basis.

Another object of my invention is to provide a method and apparatus for prefabricating of cement, a series of steps in a unit, whereby the parts to be subsequently exposed to view will have finished surfaces.

A further object of my invention is to provide a method and apparatus for prefabricating a series of steps of cement which includes a mold, preferably fashioned of metal, that is disconnectedly assembled in sections so that certain portions thereof may be removed without molesting the balance of said mold, and to facilitate ultimate removal of all the mold parts.

A still further object of my invention is to provide a method and apparatus of the type described whereby the mold may be shaken or vibrated, after the cementitious mixture has been poured therein, to cause the mixture to settle into said mold in a predetermined manner.

The foregoing objects and others ancillary thereto I prefer to accomplish as follows:

According to a preferred embodiment of my invention, I provide a sectional mold and a vibrating machine therefor. Specifically the mold is formed of metal sections which are bolted and/or pinned together, and includes a long pivotally mounted handle to facilitate the handling thereof. The mold is inverted to receive the wet cement or mixture and then placed, in this position, on a vibrating table. As the mold is vibrated the finer grained but relatively heavier particles of the mixture move toward the bottom thereof to form a denser, closely knit, smooth finish for what subsequently becomes the treads, risers, and other upper parts of the step structure. The mold is then reverted and the sections overlying the top portions of the steps are removed to permit any touching up that is necessary, while the cement is still in a plastic state. As the cement goes through the various stages of drying and curing, other sections of the mold are removed until the stair unit or structure is finally finished and ready for use.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which like characters indicate like parts throughout.

Figure 1 of the drawings is a longitudinal sectional view of the mold filled with a cementitious mixture and in an inverted position on the vibrating table.

Figure 2 of the drawings is a longitudinal sectional view of the mold filed with the mixture and with the top sections of the mold removed.

Figure 3 of the drawings is a longitudinal sectional view of the series of cast steps being supported on blocks and with the understructure of the mold still in place.

Figure 4 is a view, in elevation, of the assembled mold.

Figure 5 is a cross-sectional view of a portion of the assembled mold taken along a line corresponding to the line 5—5 in Figure 1.

Figure 6 is an enlarged cross-sectional view of a fragment of the mold showing the joint between the back of a tread section and the bottom of a riser section.

Figure 7 is an enlarged cross-sectional view of a fragment of the mold showing the joint between the front of a tread section and the top of a riser section.

A method and apparatus for prefabricating a series of steps of a cementitious mixture must have at least two totally distinct characteristics; after the wet mixture has been poured it must be subjected to a shaking or vibrating to sift the finer particles thereof to the bottom of the inverted mold; and the mold must be of sectional construction to permit partial dismantling, periodically, to expose predetermined portions of the cast material. Accordingly, a preferred embodiment of my invention, referring to Figures 1 and 4 of the drawings, is constituted by a mold 1 comprising a pair of base frame bars 2 which are adapted to support therebetween a series of hollow underforms 3 and a flat underform 4.

These underforms are hollowed to form the underportions of the steps beneath the treads and risers. The frame bars 2 and underforms 3 and 4 may be rigidly fastened together by bolts 5. As may be seen in Figure 1, the underforms 3 and 4 are spaced from each other to form openings 7 through which the wet mixture may be poured into the assembled mold. These openings 7 are closed by oblong cup-shaped plug members 8 which may be secured in position by pins 9 extending therethrough and the walls of the adjacent underforms 3 and 4.

Exterior side plates 10 are attached to the upper edges of the frame bars 2 by a series of hinge-like members 12. These side plates 10 form the exterior wall of the cast steps and extend to the top of the rails or side walls on both sides of the treads and risers. The plates 10 may be disconnected from the frame bars 2 by removing the pintles from the hinge members 12. A U-shaped bail or handle 13 is pivotally mounted on the side plates 10 to facilitate the handling of the mold, and is long enough to permit the assembled mold to be completely revolved thereon. The bail 13 may be attached to a suitable mechanism, such as a crane, to move the mold 1 from one position to another and to permit the inverting and reverting thereof.

A series of straps 14 are riveted along the upper edge of the exterior side plates 10 and extend over to be likewise attached to the upper edges of interior side plates 15. The space between the exterior side plates 10 and the interior side plates 15 forms the rails or side walls of the steps proper. The straps 14 are formed over and spaced from the upper edges of the side plates 10 and 15 to form a groove or passage therebetween to slidably receive a top plate 17 which may extend over the full length of the side walls.

The top plate 17 is provided with a rolled edge or knob 18 at its front end to facilitate handling and also act as a stop to prevent its being inserted past the ends of the side plate. Said top plate is also provided with apertures near its rear end to receive bolts 19 which extend therethrough and screw into shoulders 20 located on the outer extremities of an angle plate 2. The angle plate 22 extends over a portion of the top, and down a portion of the rear of the side plates to be pivotally attached by a hinge 23, to the rear plate or wall 24 of the mold 1. Like the top plate 17, to which it is attached, the angle plate 22 also covers a portion of the space between the outer side walls 10 and the inner side walls 15.

Rear plate 24 may be permanently fixed in position between the side plates as by welding. Likewise a plurality of plates 25 may be located between the inner side plates 15 to form the facings of the risers of the steps. These riser plates 25 are fashioned to cooperate with slidable plates 27, located at right angles thereto, which form the facings of the treads of the steps. As best shown in Figures 6 and 7, the riser plates 25 are turned over at the top and bottom to form rounded corners on the steps. These rounded corners are desirable as they are easier to form in the mold, they are not apt to stick to the mold when the top portions thereof are removed while the aggregate is still wet and, after the steps are in use, they are not so apt to chip or break off as square corners would be.

The bottom of each riser plate 25, best shown in Figure 6, is turned under to form an angle 28. A transverse bar 29 is fixed, as by rivets 30, across the top of the angle 28, and cooperates with the slanting edge 32 of the angle 28 to form a dovetail to receive the complementary formed rear edge 33 of the tread plate 27. Angle bars 34 fixed to the inner side walls 15, as by rivets 35, are adapted to cooperate with the transverse bar 29 to slidably receive and support the tread plate 27. These angle bars 34 extend across the full width of the tread plate 27 and, as best shown in Figure 7, cooperate with the top of the next riser plate 25 to form a groove to receive the tread plate 27.

The top 37 of each riser plate 25 is turned over and tapered to lie flush against the tread plate 27 so as to form a smoothly rounded corner without any breaks or edges in the surface of the steps. Adjacent and in line with the top 37 of the riser plate 25 is fixed, as by rivets 38, a transverse angle bar 39 which is adapted to lie flush with the front edge of the tread plate 27. Complementary apertures extend through the front of the tread plate 27 and the transverse angle bar 39 and are adapted to receive bolts 40, whereby the tread plate may be locked in place. The above described construction may be duplicated throughout the complete series of steps.

It is readily evident from the foregoing description that my mold is formed in sections which may be removed piecemeal to expose predetermined portions of the cast cement or mixture. I have also invented a unique process, including the use of my sectional mold, for prefabricating a series of steps, of concrete or similar material, as will be described hereinafter.

After my mold 1 is completely assembled, with the exception of the plug members 8, it is ready to be put in operation and is arranged so that the openings 7 are on the upper side ready to receive the mixture. Meanwhile a frame 42 has been positioned in the mold 1 in any desired manner to reinforce the final cast structure. After the mixture 43 has been poured through the openings 7 into the mold 1, the structure is placed on the table and vibrated and as the material is shaken down, new material may be filled in as may be found necessary, after which the openings 7 are closed by the plugs 8 fastened by pins 9.

The vibrating table 44 may be formed in any convenient manner and I show one, in Figure 1, comprising a foundation frame 45 and a vibrating platform 47. The foundation frame 45 supports a pair of shafts 48 which carry a plurality of cams or eccentrics 49. The vibrating platform 47 carries a plurality of bearings 50 adapted to cooperate with the cams 49 and to support said platform thereon. The shafts 48 may be driven in any desired manner such as by the chain drives 52 connected to a motor 53. As the motor 53 drives the shafts 48 by the chain drives 52, the cams 49 riding in and supporting the bearings 50 will vibrate the platform 47.

As the filled mold 1 rests upon the vibrating platform 47 the whole mold 1 and its contents will be vibrated or shaken. The vibration or shaking motion will cause the mixture 43 to settle in the mold 1 so that the finer and heavier particles thereof will sift to the bottom of the mold, as shown in Figure 1, leaving the coarser portions of the mixture on top. As the mold 1 is inverted the bottom portions thereof which are filled with the finer particles of the mixture 43 are actually the top portions of the steps such as the treads and risers. This process provides a smooth, fine grained facing on the parts of the steps which are visible when said steps are eventually positioned for use.

After sufficient vibrating or shaking the mold 1 is removed from the vibrating table 44 and reverted to an upright position as shown in Figure 2. While the mixture 43 is still wet and in a plastic state the top portions of the mold 1 are removed to permit an inspection of the facings of the cast steps. If, by any chance, air pockets or other deformations in the facings are evident they can then be smoothed over by hand. In dismantling the mold 1, as shown in Figure 2, the bolts 40 are first removed and the tread plates 27 slid out of position. The bolts 19 are likewise removed and the top plates 17 slidably removed, after which the angle plates 22 may be pivoted out of position. At this stage of the process all of the top facings are uncovered.

As the mixture 43 becomes firmly set, but is still slightly plastic the whole upper structure of the mold 1 is removed. To accomplish this the pins are removed from the hinge-like fastenings 12 between the outer side walls 10 and the base bars 2. As the whole upper structure is firmly fastened together and includes the outer side walls 10, the inner side walls 15 and the riser walls 25 extending therebetween, it may be conveniently removed by lifting with the handle 13. The newly exposed facings may now be examined and if necessary be touched up. The cast structure may now be left to dry while still supported by the understructure of the mold 1.

After the cast steps have become sufficiently dry the pins 9 and the plug members 8 may be removed and, as shown in Figure 3, the casting may be set on suitable blocks 54 which may be supported by a table or bench 55. The blocks 54 extend through the openings 7 with understructure of the mold 1 and support the casting 43 by direct contact therewith. They are mounted on the bench 55 to permit easy access to the remaining understructure of the mold 1. At this stage of the process the bolts 5 may be removed to permit the separation and removal of the understructure which includes the base bars 2 and the undersupports 3 and 4. After the last sections of the mold 1 have been removed, the casting may be left to cure until ready for use.

The many advantages of my sectional mold and method for prefabricating a series of steps in a unit should be readily evident from a study of the foregoing description. Though I have illustrated my method and mold as designed for casting a series of steps it is quite evident that the mold may be redesigned to accommodate other types of castings.

Although I have shown and described certain specific embodiments of my invention, I am fully aware that many modifications thereof are possible. My invention, therefore, is not to be restricted except insofar as is necessitated by the prior art and by the spirit of the appended claims. What I claim and wish to secure by Letters Patent in the United States of America is:

1. An apparatus for prefabricating a concrete stair structure comprising a mold which includes in combination a base section for molding the under parts of said stair structure, a partially assembled top section for molding the side walls and risers, a plurality of plates adapted to be slidably received by said top section and for molding treads, and means for securing said sections together with sufficient rigidity to permit the entire apparatus to be manipulated as an inflexible unit.

2. A mold for casting a concrete stair structure which comprises a base portion having a plurality of sections for molding the under parts of said stair structure, a partially assembled top portion having a plurality of sections permanently secured together for molding the side walls and risers, said top portion being adapted to slidably receive a plurality of plates for molding treads, and means for securing said two portions, and plates together with sufficient rigidity to permit the entire apparatus to be manipulated as an inflexible unit.

3. A mold for casting a concrete stair structure which comprises a base portion having a plurality of sections and including openings therebetween, complementary closures for said openings, a partially assembled top portion having a plurality of sections permanently secured together and adapted to slidably receive a plurality of plates to complete said top portion, whereby to mold the treads and risers, means for securing said closures and plates together with their respective portions, and means for securing said two portions together with sufficient rigidity to permit the entire apparatus to be manipulated as an inflexible unit.

4. A mold for casting a concrete stair structure which comprises a base portion having a pair of supporting bars, a plurality of base sections secured therebetween and spaced from each other and including closures for the spaces between said base sections, a partially assembled top portion having a plurality of sections permanently secured together and adapted to slidably receive a plurality of plates to complete said top section, whereby to mold treads and risers, and means for securing said two portions together with sufficient rigidity to permit the entire apparatus to be manipulated as an inflexible unit.

5. A mold for casting a concrete stair structure which comprises a base portion having a pair of supporting bars, a plurality of base sections secured therebetween and spaced from each other and including closures for the spaces between said base sections, a top portion having side wall sections and a plurality of intermittently spaced riser sections permanently secured therebetween and adapted to slidably receive a plurality of plates to complete said top section, whereby to mold treads and risers, and means for securing said two portions together with sufficient rigidity to permit the entire apparatus to be manipulated as an inflexible unit.

6. A mold for casting a concrete stair structure which comprises a base portion having a pair of supporting bars, a plurality of base sections secured therebetween and spaced from each other and including closures for the spaces between said base sections, a top portion having side wall sections and a plurality of intermittently spaced riser sections permanently secured therebetween and adapted to slidably receive a plurality of plates to complete said top section, whereby to mold treads and risers, and means for securing said two portions together with sufficient rigidity to permit the entire apparatus to be manipulated as an inflexible unit and a handle pivotally mounted on said wall sections of said top portion to facilitate the handling of the top portion with respect to the base portion or of the mold as a unit.

7. An apparatus for prefabricating a concrete stair structure, comprising a mold assembly having a base section adapted for molding the under parts of the stair structure, a top section for molding the sides and risers of the stair structure, plates slidably and removably associated with the said top section for molding the treads of the stair structure, means for securing the base and top sections and plates together, and a bail member for pivotally supporting the mold assembly whereby it may be inverted and reverted in its assembled state.

8. An apparatus for prefabricating a concrete stair structure, comprising a mold assembly having a base section adapted for molding the under parts of the stair structure, plug members removably mounted in the base section for filling the mold, a top section for molding the sides and risers of the stair structure, plates slidably and removably associated with the said top section for molding the treads of the stair structure, and means for securing the base and top sections and plates together.

9. An apparatus for prefabricating a concrete stair structure, comprising a mold assembly having a base section adapted for molding the under parts of the stair structure, plug members removably mounted in the base section for filling the mold, a top section for molding the sides and risers of the stair structure, plates slidably and removably associated with the said top section for molding the treads of the stair structure, means for securing the base and top sections and plates together, and a bail member pivotally supporting the mold assembly whereby it may be inverted for removal of the plug members and filling the mold and reverted for removal of the tread molding plates.

10. An apparatus for prefabricating a concrete stair structure, the same comprising a mold assembly including a base section having mold members for forming the underside of the stair structure and having openings for filling the mold, plug members removably mounted in the said openings, side members rigidly supported on the base section, a top section for the mold and for molding the sides and risers of the stair structure, the said top section being removably mounted on the base section and having openings to expose the treads of the stair structure, closure plates removably mounted over the said opening for molding the said treads, and a removable top plate assembly mounted over the top section of the mold.

11. An apparatus for prefabricating a concrete stair structure, the same comprising a mold assembly made up of a base section and a removable top section, the said base section including hollow underforms for molding the undersides of the steps of the stair structure, the said underforms being spaced apart to form openings therebetween through which the mold may be filled, complementary plug members removably mounted in the openings, the top section of the mold comprising side and riser molding parts rigidly assembled and having spaced slideways, plates removably mounted in the said slideways for molding the treads of the stair structure, and means for releasably securing the plug members, top section of the mold and the said plates in assembled relation.

FRANK KOGL.

---

CERTIFICATE OF CORRECTION.

Patent No. 2,161,822.        June 13, 1939.

FRANK KOGL.

It is hereby certified that error appears in the above numbered patent requiring correction as follows: In the grant, and in the heading to the printed specification, residence of inventor, for "St. Kogl, Minnesota" read St. Paul, Minnesota; and that the said Letters Patent should be read with this correction therein that the same may conform to the record of the case in the Patent Office.

Signed and sealed this 11th day of July, A. D. 1939.

Henry Van Arsdale
Acting Commissioner of Patents.

(Seal)

and top sections and plates together, and a bail member for pivotally supporting the mold assembly whereby it may be inverted and reverted in its assembled state.

8. An apparatus for prefabricating a concrete stair structure, comprising a mold assembly having a base section adapted for molding the under parts of the stair structure, plug members removably mounted in the base section for filling the mold, a top section for molding the sides and risers of the stair structure, plates slidably and removably associated with the said top section for molding the treads of the stair structure, and means for securing the base and top sections and plates together.

9. An apparatus for prefabricating a concrete stair structure, comprising a mold assembly having a base section adapted for molding the under parts of the stair structure, plug members removably mounted in the base section for filling the mold, a top section for molding the sides and risers of the stair structure, plates slidably and removably associated with the said top section for molding the treads of the stair structure, means for securing the base and top sections and plates together, and a bail member pivotally supporting the mold assembly whereby it may be inverted for removal of the plug members and filling the mold and reverted for removal of the tread molding plates.

10. An apparatus for prefabricating a concrete stair structure, the same comprising a mold assembly including a base section having mold members for forming the underside of the stair structure and having openings for filling the mold, plug members removably mounted in the said openings, side members rigidly supported on the base section, a top section for the mold and for molding the sides and risers of the stair structure, the said top section being removably mounted on the base section and having openings to expose the treads of the stair structure, closure plates removably mounted over the said opening for molding the said treads, and a removable top plate assembly mounted over the top section of the mold.

11. An apparatus for prefabricating a concrete stair structure, the same comprising a mold assembly made up of a base section and a removable top section, the said base section including hollow underforms for molding the undersides of the steps of the stair structure, the said underforms being spaced apart to form openings therebetween through which the mold may be filled, complementary plug members removably mounted in the openings, the top section of the mold comprising side and riser molding parts rigidly assembled and having spaced slideways, plates removably mounted in the said slideways for molding the treads of the stair structure, and means for releasably securing the plug members, top section of the mold and the said plates in assembled relation.

FRANK KOGL.

---

CERTIFICATE OF CORRECTION.

Patent No. 2,161,822.                June 13, 1939.

FRANK KOGL.

It is hereby certified that error appears in the above numbered patent requiring correction as follows: In the grant, and in the heading to the printed specification, residence of inventor, for "St. Kogl, Minnesota" read St. Paul, Minnesota; and that the said Letters Patent should be read with this correction therein that the same may conform to the record of the case in the Patent Office.

Signed and sealed this 11th day of July, A. D. 1939.

Henry Van Arsdale
Acting Commissioner of Patents.

(Seal)